United States Patent [19]
Lemaire et al.

[11] Patent Number: 5,841,920
[45] Date of Patent: Nov. 24, 1998

[54] FIBER GRATING PACKAGE

[75] Inventors: Paul Joseph Lemaire, Morris; George John Shevchuk, Middlesex, both of N.J.

[73] Assignee: Lucent Technologies Inc., Murray Hill, N.J.

[21] Appl. No.: 819,824

[22] Filed: Mar. 18, 1997

[51] Int. Cl.$^6$ .................................................. G02B 6/34
[52] U.S. Cl. .............................................................. 385/37
[58] Field of Search ................................ 385/37, 31, 15; 359/566, 34; 348/291

[56] References Cited

U.S. PATENT DOCUMENTS

| | | | |
|---|---|---|---|
| 4,725,110 | 2/1988 | Glenn et al. | 350/3.61 |
| 5,042,898 | 8/1991 | Morey et al. | 385/37 |
| 5,367,589 | 11/1994 | MacDonald et al. | 385/37 |
| 5,694,503 | 12/1997 | Fleming et al. | 385/37 |

*Primary Examiner*—John D. Lee
*Assistant Examiner*—Ellen E. Kang

[57] ABSTRACT

A temperature compensating optical waveguide device including an optical fiber in which a grating formed of grating elements embedded within the fiber core reflects fiber-transmitted light within a range about a central wavelength that varies with temperature and with an axial strain applied to the grating. A top surface of a compensating member is affixed to a portion of the fiber that includes the grating and a tension adjusting member is connected to the compensating member. The tension adjusting member and the compensating member are formed of materials selected so that as the temperature of the device decreases, the tension adjusting member contracts more than the compensating member so as to control the deformation of the compensating member and thereby impose an axial strain on the grating. The controlled application of tensile stress to the optical fiber in the region of the grating causes changes in the central wavelength of reflected light to compensate for central wavelength variations resulting from changes in the grating temperature.

24 Claims, 3 Drawing Sheets

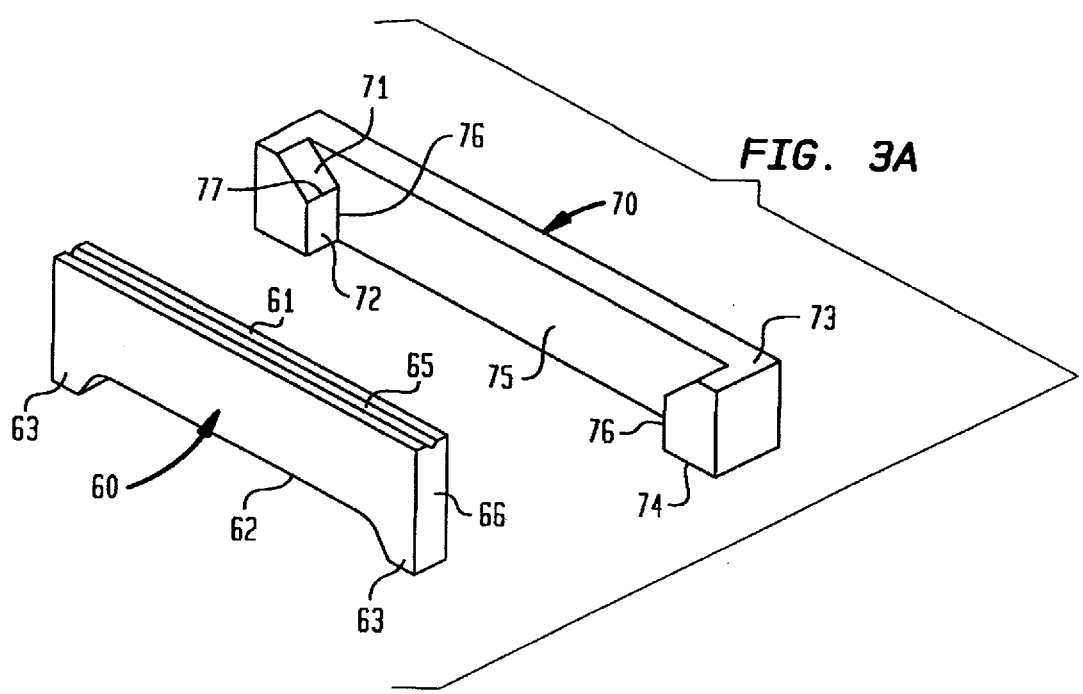
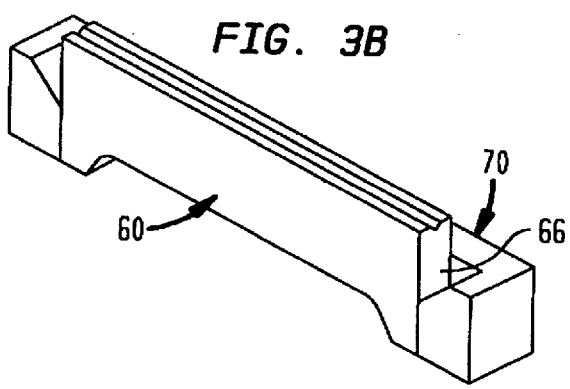
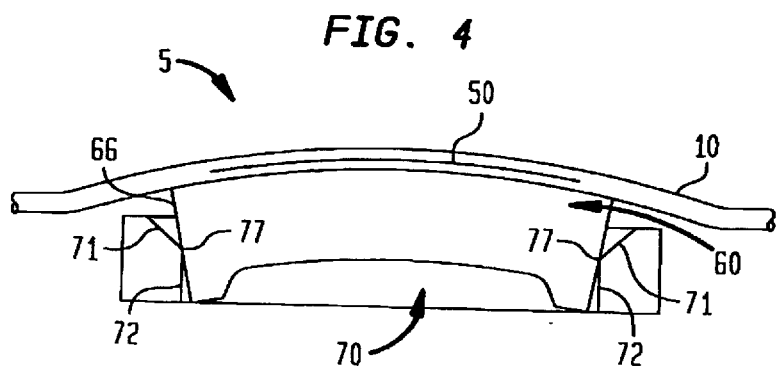

FIBER GRATING PACKAGE

BACKGROUND OF THE INVENTION

1. Field of the Invention

The present invention relates to optical filters and, in particular, to improved accuracy filtering devices, such as Bragg filters, incorporated in optical waveguides, such as optical fibers.

2. Description of Related Art

The placement of an optical filter in a fiber optic device to reflect particular light wavelengths is well known. U.S. Pat. No. 4,725,110, which is incorporated herein by reference, discloses a method for incorporating a Bragg filter in an optical fiber. This method impresses phase gratings along the core of an optical waveguide by applying intense beams of ultraviolet light transverse to the axis of the core at selected angles of incidence and angles complementary thereto. The ultraviolet beams induce a permanent change in the refractive index in a predetermined region of the core, thereby creating a phase grating effective for affecting light in the core at selected wavelengths. The wavelength selectivity of such fiber gratings, however, is dependent upon temperature and strain of the grating region, thereby limiting its field of use. More particularly, the basic filter arrangement is precluded from use, for example, as a wavelength standard in which it is desirable to maintain a reflected light wavelength independent of temperature.

One effort to significantly reduce, if not virtually eliminate, the influence of temperature variations on the wavelength selectivity of an optical filter is described in U.S. Pat. No. 5,042,898. The therein disclosed temperature compensated optical waveguide device is based on the concept that changes or shifts in wavelength attributable to changing optical grating strains can be used to counteract and/or eliminate shifts in wavelength resulting from variations in the optical grating temperature. For example, a constant wavelength of reflected light may be maintained during a drop in temperature by increasing the longitudinal strain on the fiber, and vice versa. In the compensation device described in U.S. Pat. No. 5,042,898, a portion of the optical fiber containing the embedded grating is sectioned off by securing the optical fiber at each side of the grating to separate metallic compensating sections arranged for longitudinal movement relative to one another. By mechanically adjusting the compensating members longitudinally relative to each other to thereby vary the distance between them, there is imposed on the optical grating a longitudinal strain of a magnitude that varies in a manner to balance out or compensate for wavelength variations resulting from changes in the temperature of the grating. This prior art temperature compensating waveguide device arrangement is, however, cumbersome and expensive to manufacture.

In theory, it should be possible to reduce the overall size and expense previously associated with temperature compensating waveguide devices by directly bonding or mounting to the cladding of the optical fiber, in the region of the grating, a single compensating member. The single compensating member would require a material with an expansion coefficient capable of imposing appropriate temperature-induced strains on the optical fiber, as for example $-9 \times 10^{-6}/^\circ$ C. This alternative, however, is not practical since a material possessing the required expansion coefficient properties is not commonly known or readily available, if it exists at all.

Therefore, it is desired to provide a device capable of compensating for and/or substantially eliminating the influence of temperature variations on the filter wavelength, the device being relatively small in size and inexpensive to manufacture.

SUMMARY OF THE INVENTION

The present invention provides an arrangement for introducing in an optical fiber a strain that compensates for temperature-induced changes in the wavelength reflected by the grating elements. The inventive device has two components. The first is affixed to the fiber proximate the grating and has a lower coefficient of thermal expansion than the coefficient of thermal expansion of the second component. For convenience, these coefficients of thermal expansion herein are referred to as the first and second coefficients of thermal expansion, respectively. The materials of the first and second components cooperate so that the device exerts a force on the fiber in dynamic response to changes in the grating temperature to thereby control the wavelength that is reflected by the grating elements.

In a preferred embodiment, the inventive temperature compensating optical waveguide device includes an optical fiber in which the grating elements are embedded in a core of the fiber to reflect light within a range about a central wavelength that is affected by the temperature of and axial strain applied to the grating. A top surface of a compensating member is secured to the fiber at or proximate the grating. A tension adjusting member restrains, in an axial direction, a portion of the compensating member relative to the tension adjusting member.

The tension adjusting member and the compensating member are formed of materials each selected so that as the temperature of the inventive device decreases, the tension adjusting member contracts more than the compensating member and thus imposes an axial strain on the grating. As the temperature of the device similarly increases, the tension adjusting member expands to a greater extent than the compensating member to thereby ease the axial strain imposed on the grating. Tensile stress is thus applied to the optical fiber, in the region of the grating, so as to counterbalance and compensate for wavelength variations resulting from changes in the grating temperature.

The temperature compensation waveguide device of the present invention is thus operable to dynamically control the wavelength of grating-reflected light by exerting an axial strain on the optical grating embedded within a core of the waveguide. Moreover, the inventive temperature compensating optical waveguide device is relatively small in overall size and advantageously inexpensive to manufacture.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters depict similar elements throughout the several views:

FIG. 3A is an elevated perspective exploded view, and FIG. 3B is an assembled view, of the compensating and tension adjusting members of the device of FIG. 1;

FIG. 4 is a cross-sectional side view of the temperature compensated optical waveguide device of FIG. 1 in a second operational state in which the device is at a temperature lower than the approximately highest operating temperature;

DETAILED DESCRIPTION OF THE PRESENTLY PREFERRED EMBODIMENTS

Figure 1:
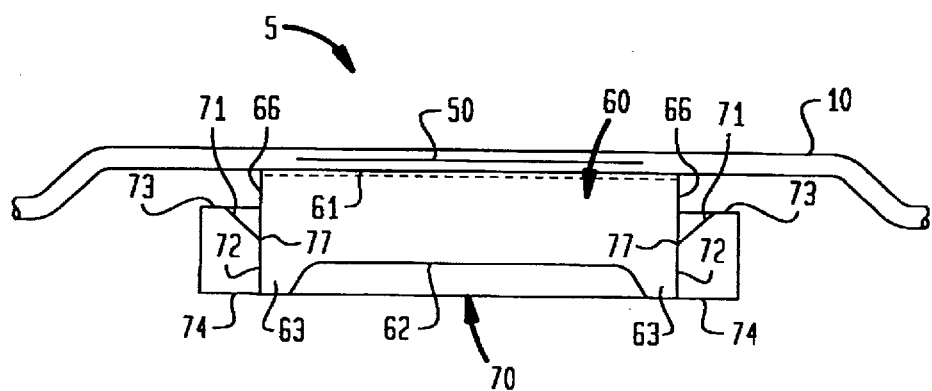
FIG. 1 is a cross-sectional side view of a first embodiment of a temperature compensated optical waveguide device constructed in accordance with the present invention in a first operational state in which the device is at an approximately highest operating temperature.
Figure 2:
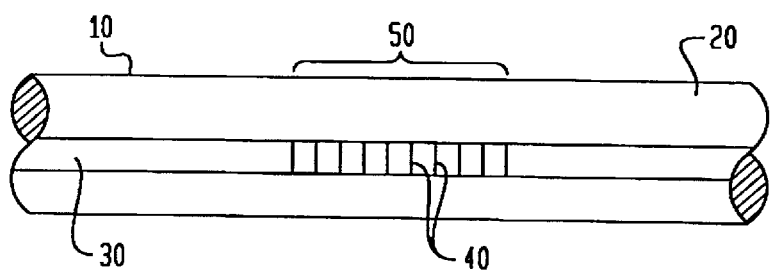
FIG. 2 is a longitudinal side view of the optical fiber of the device of FIG. 1.

FIG. 1 cross-sectionally depicts a first embodiment of a temperature compensated optical waveguide device 5 in accordance with the present invention in a first operational state in which the device is at an approximately highest operating temperature. The optical waveguide is implemented as an elongated optical fiber 10, of which only a longitudinal portion is depicted. As shown in FIG. 2, optical fiber 10 comprises a fiber core 30 and a fiber cladding 20 surrounding the core. Embedded within a region of the core 30 of fiber 10 is a grating 50 formed of a multiplicity of grating elements 40. In a preferred embodiment, the grating elements 40 are substantially equidistantly spaced from one another along the longitudinal extension of the fiber and extend substantially normal to the fiber axis; nevertheless, the use of blazed fiber gratings or dispersion compensating gratings such as chirped fiber gratings, by way of nonlimiting example, is also within the intended scope and contemplation of the invention.

Grating 50 may be any desired or suitable type of optical filter, as for example a Bragg filter. Preferably, grating 50 is produced within the core 30 of fiber 10 using the method disclosed in U.S. Pat. No. 4,725,110, the entire disclosure of which is incorporated by reference herein. Formation of the grating in this manner ensures that the grating elements are created only within a desired grating region of the fiber core and substantially equidistantly spaced apart along the fiber's longitudinal extension.

In the embodiment shown in FIG. 1, the device 5 further includes a compensating member 60 that, in the illustrated embodiment, is generally rectangularly-shaped with a top surface 61 to which the optical fiber 10 is affixed and a longitudinally extending bottom cutout 62 defining two protruding sections or legs 63 that project away from the fiber 10 at the opposite ends of the member 60. The top surface 61 of compensating member 60 is secured to the fiber as to the peripheral surface of the cladding 20, at or proximate the grating 50 so that at least a portion of the surface 61 is affixed to the fiber region of the grating 50. To assist in such securement a channel 65 sized for receiving or accommodating a circumferential portion of the fiber 10 may be defined in and longitudinally along the top surface 61 of the member 60. Although the top surface 61 is depicted as substantially flat and uncurved, it is also contemplated that it may be slightly curved along its length to assist in bending deformation as will hereafter be apparent.

The device 5 further includes, as perhaps best seen in FIG. 3A, a tension adjusting member 70. The member 70 is formed as a bracket having a recessed back wall 75 and side walls 76 that define a channel sized for receiving, as seen in FIG. 3B, the compensating member 60 in nestedly-recessed relation therewith. In the preferred form of the invention shown in FIGS. 1 to 4, the depth of the tension adjusting member channel is substantially equal to the lateral width of the compensating member 60 so that, in their assembled FIG. 3B condition, the respective front faces of the members 60, 70 define a substantially flush and continuous surface along their combined longitudinal extent. Also in this embodiment the compensating member has a height greater than the height of the tension adjusting member 70 so that, in their assembled condition, the top surface 61 of the member 60 extends above the top surface 73 of the member 70. Each side wall 76 of the member 70 comprises a first portion 72 that extends substantially perpendicularly upward from a bottom surface 74 of the member 70 and which abuts a respective end wall 66 of the compensating member 60 in the initially-assembled condition (FIG. 3B) of the members 60, 70, and a second portion 71 that extends from the first portion 72 to the top surface 73 of the member 70 and which is angularly oriented relative to the first portion 72 so that the second portion 71 does not abut the compensating member end wall 66 in the FIG. 3B initially-assembled condition of the members 60, 70.

For reasons that will hereinafter be apparent, the members 60, 70 of the inventive device 5 are initially assembled at the approximately highest temperature at which the device 5 is intended to operate. This assures that as the ambient temperature—and, correspondingly, the temperature of the fiber grating 50 and members 60, 70—varies, the relative distortions of the members 60, 70 by which a correspondingly varying stress is applied to the grating will compensate for the light-reflective effects on the grating of temperatures lower than the approximately highest operating temperature at which the members 60, 70 are initially assembled. Those skilled in the art will nevertheless recognize and appreciate, in conjunction with the teachings of this disclosure, that the members may alternatively be assembled at the approximately lowest temperature at which the device 5 is intended to operate, with suitable changes to the members 60, 70. This and like modifications should be understood as being within the intended scope and contemplation of the invention.

In any event, and in the preferred forms of the invention in which the members 60, 70 are initially assembled together at the approximately highest operating temperature, the compensating member 60 may be formed or fabricated from any material having a characteristic thermal expansion coefficient that is less or smaller than the characteristic thermal expansion coefficient of the tension adjusting member 70, to thereby provide for differential contraction and expansion of the members 60, 70 with changes in the temperature of the device 5. The compensating member 60 and tension adjusting member 70 are preferably fabricated of structural metals. Alternatively, the compensating member 60 may be formed of plastic, as for example as molded liquid crystal polymer having a characteristic thermal expansion coefficient of about $-2 \times 10^{-6}/°$ C., and the tension adjusting member 70 may be formed of a metal such as one having a characteristic thermal expansion coefficient greater than about $-2 \times 10^{6}/°$ C. as, by way of example, stainless steel with an expansion coefficient of $17 \times 10^{6}/°$ C. The greater the difference between the thermal expansion coefficients of the materials forming the compensating member 60 and tension adjusting member 70, the greater the axial strain that will be applied to or imposed on the optical fiber. The amount of axial strain operatively produced in accordance with the invention is also dependent on the geometries of the compensating and tension adjusting members 60, 70.

FIG. 1 shows the preferred temperature compensated optional waveguide device 5 at a first operated state at which the device temperature is the approximately highest operating temperature at which the device 5 is initially assembled or fabricated. FIG. 4 depicts the device 5 of FIG. 1 at a second operational state in which the temperature of the device 5 is substantially below that of the approximately highest operating temperature. As a comparison of the two operational states makes evident, as the temperature of the waveguide device 5 decreases the tension adjusting member 70 deformingly contracts to a greater extent than the compensating member 60, thereby providing a differential contraction or shrinkage of the assembled members 60, 70. Through such differential shrinkage the first portions 72 of the side walls 76 of the tension adjusting member 70 exert inwardly-directed forces—particularly at the junctures 77 of the first and second side wall portions 72, 71—on the end walls 66 of member 60; these forces cause compensating member 60 to deform longitudinally along its bottom including the legs 63 which are forced toward one other and its top surface 61 to curvedly elongate. As compensating member 60 thus longitudinally bends, or deforms, its side walls 66 angularly pitch and approach the angled orientations of the second portions 71 of the tension adjusting member side walls 76. The resulting increased or amplified strain developed along the top surface 61 of the compensating member 60 exerts, in turn, an amplified strain on the optical fiber 10 in the region of grating 50 which compensates for and thereby substantially eliminates fluctuations in reflected light wavelength resulting from variations in the grating temperature. When, on the other hand, the temperature of the waveguide increases, the tension adjusting member 70 longitudinally expands to ease the strain along the top surface 61 of compensating member 60 and, in turn, thereby reduce the strain applied to the optical fiber 10 in the region of grating 50.

In operation, in the first operational state with the device 5 at the approximately highest operating temperature, the top surface 61 of compensating member 60 is secured or affixed to the cladding 20 of optical fiber 10 and tension adjusting member 70 is positioned partially envelopingly about compensating member 60 so that the first portions 72 of the side walls 76 of the member 70 abut the compensating member ends walls 66. As the device 5 thereafter cools to a temperature lower than the approximately highest operating temperature, tension adjusting member 70 deformedly contracts to a greater degree than compensating member 60, causing the perpendicular first portions 72 of the side walls 76 to exert inwardly-directed forces against the end walls 66 of the compensating member 60. These forces cause the compensating member 60 to bend in the manner shown in FIG. 4 so that the end walls 66 thereof are angularly reoriented and approach the opposed faces of the second portions 71 of the side walls 76 of member 70. The resulting deformation of optical fiber 10 imposes a longitudinally-directed strain on optical grating 50 embedded within the fiber core; this grating strain compensates for and thereby substantially eliminates reflected light wavelength variations caused by changes in the grating temperature. As the temperature of the device similarly increases, tension adjusting member 70 longitudinally expands and thereby eases the longitudinal strains imposed on grating 50. Thus, in accordance with the invention a tensile stress is applied to and along the optical fiber in the region of the grating, the applied stress decreasing as the temperature of the device 5 increases and increasing as the temperature of the device 5 decreases.

Figure 5:
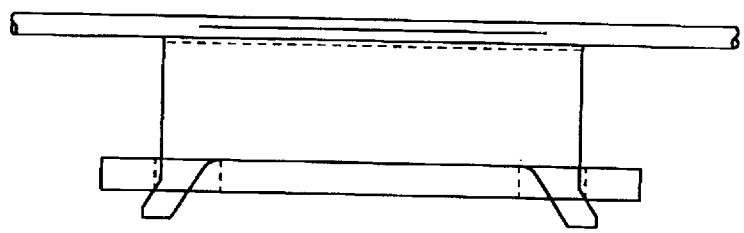
FIG. 5 is a cross-sectional side view of a second embodiment of a temperature compensated optical waveguide device constructed in accordance with the present invention in a first operational state in which the device is at an approximately highest operating temperature.
Figure 6:
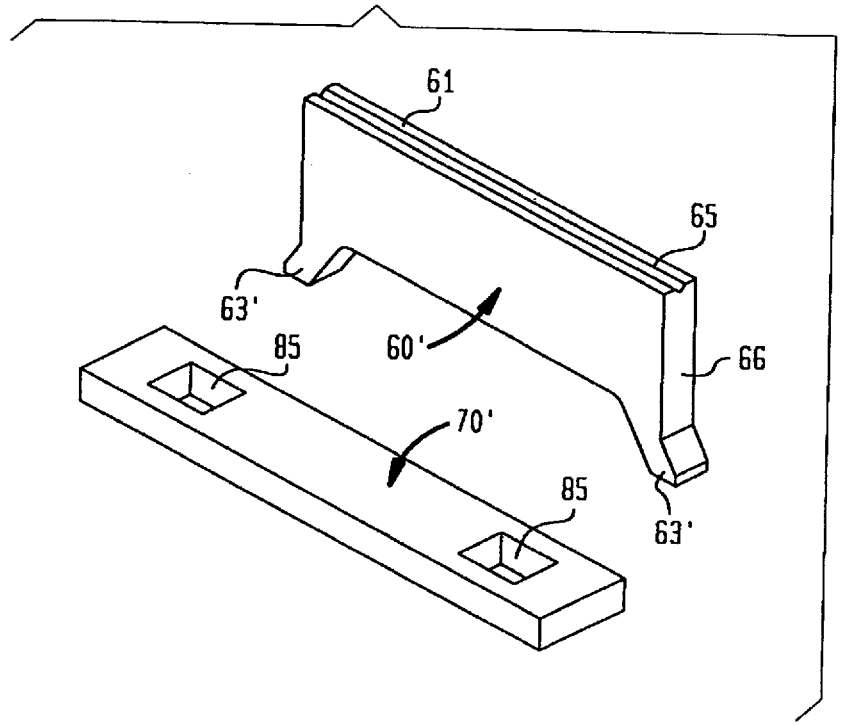
FIG. 6 is an elevated perspective exploded view of the compensating member and tension adjusting member of the device of FIG. 5.

A somewhat modified second embodiment of a temperature compensated waveguide device 5' constructed in accordance with the present invention is shown in FIGS. 5 and 6. As in the earlier-described embodiment of FIGS. 1 to 4, the device 5' includes a waveguide here shown as an optical fiber 10 having a fiber core 30, surrounding cladding 20 and a grating 50 embedded within a region of the core. Here, too, the device 5' further includes a compensating member 60' to which the fiber 10 is affixed or secured along the top surface 61 of the member 60', as for example in a channel 65, and a tension adjusting member 70' that cooperatively mates with the member 60' to provide the stress-adjustment functionality by which the inventive device operatively compensates for the wavelength-varying effects of temperature variations. What is different in this modified embodiment is the particular configurations of the members 60', 70'. Specifically, the legs 63' of the compensating member 60' extend longitudinally outwardly from and beyond the end walls 66, a construction readily attainable and particularly well-suited for use when the compensating member is fabricated from a material capable of being molded, such as a liquid crystal polymer. In addition, the tension adjusting member 70' of this embodiment is formed as a substantially rectangular, initially flat plate having defined, proximate each longitudinal end thereof, an aperture 85 that extends through the plate from top to bottom and which is dimensioned and shaped to receive and accommodate therethrough a corresponding one of the compensating member legs 63' when the members 60', 70' are assembled in the manner shown in FIG. 5.

As in the first-described embodiment of FIGS. 1 to 4, the device 5' is assembled at the approximately highest temperature at which the device 5' is intended to operate; this initially-assembled condition is illustrated in FIG. 5. Also as in that first embodiment, the compensating member 60' is formed of a material having a characteristic thermal expansion coefficient smaller than the characteristic thermal expansion coefficient of the material from which the tension adjusting member 70' is fabricated. In this manner, as the temperature of the device 5' decreases from the approximately highest temperature, the tension adjusting member 70' deformingly contracts to a greater degree than the compensating member 60'. The resulting differential contraction or shrinkage of the assembled member 60', 70' causes the member 70' to apply to each compensating member leg 63' a moving force directed toward the other leg, thereby imparting an upward (in the Figures) arc or curvature to the top surface 61 of the member 60' and the fiber region affixed thereto and applying to the fiber 10, in the region of the grating 50, a longitudinal deformation or strain to compensate for changes in reflected light wavelength resulting from variations in the grating temperature.

The temperature compensated optical waveguide device of the present invention is suitable for a wide variety of uses and applications. By way of example, the inventive device may be employed as a wavelength standard, as a means for stabilizing the emission frequency of laser diodes that are used as light sources, or as a local oscillator for coherent communications or multiplexed data links. The temperature compensated optical waveguide device may also be used in a Density Wavelength Division Multiplex (DWDM) system as an add drop filter.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A temperature compensating optical waveguide device, comprising:

an optical fiber for passage of light therethrough and including a grating located and configured for reflecting light passing through the fiber within a range about a central wavelength that varies with changes in temperature of the device and with changes in an axial strain applied to the fiber at the grating;

a compensating member having a first portion affixed to said fiber proximate said grating and a second portion spaced from said first portion, said compensating member being formed of a material having a first temperature expansion coefficient; and a tension adjusting member formed of a material having a second temperature expansion coefficient greater than said first temperature expansion coefficient and connected to said compensating member so that a decrease in temperature of said device causes a differential contraction of said tension adjusting member relative to said compensating member by which the tension adjusting member applies to said compensating member second portion a force that imparts a curvature to said first portion and an axial strain to the affixed fiber at said grating to vary the central wavelength of reflected light passing through the fiber and thereby compensate for central wavelength variations introduced by the decrease in temperature.

2. A temperature compensating optical waveguide device in accordance with claim 1, wherein said compensating member first portion comprises a first surface in which a groove for receiving the affixed optical fiber is defined.

3. A temperature compensating optical waveguide device in accordance with claim 1, wherein said compensating member first portion comprises a first surface to which the optical fiber is affixed, and said compensating member second portion comprises a pair of spaced apart legs to which said tension adjusting member operatively applies said force that imparts a curvature to said first portion with a decrease in temperature by causing with said force a decrease in said spacing between the legs to curvedly deform said compensating member and thereby impart said curvature to said first surface to which the optical fiber is affixed.

4. A temperature compensating optical waveguide device in accordance with claim 3, wherein said temperature compensating member comprises an elongated member having a pair of apertures each located and configured for receiving therethrough one of said compensating member legs so that said temperature compensating member applies to said legs said force that imparts a curvature to said compensating member first portion with a decrease in temperature of said device.

5. A temperature compensating optical waveguide device in accordance with claim 4, wherein said compensating member further comprises an elongated member having opposed end walls, and wherein each of said compensating member legs extends longitudinally outwardly beyond one of said end walls.

6. A temperature compensating optical waveguide device in accordance with claim 3, wherein said compensating member second portion comprises a second surface in which a recess forming said pair of spaced apart legs is defined.

7. A temperature compensating optical waveguide device in accordance with claim 1, wherein said compensating member further comprises an elongated member having opposed end walls, and wherein said tension adjusting member includes a pair of confrontingly-opposed sidewalls each comprising a first part that, in an initially-assembled condition of said compensating and tension adjusting members, is disposed in substantial abutment with one of said compensating member end walls and a second part that, in said initially-assembled condition, is disposed in angularly-spaced relation to said one end wall.

8. A temperature compensating optical waveguide device in accordance with claim 7, wherein said tension adjusting member further comprises a recess in which at least a part of said compensating member is disposed and defining said confrontingly-opposed sidewalls.

9. A temperature compensating optical waveguide device in accordance with claim 1, wherein said grating comprises a multiplicity of grating elements spaced axially along the optical fiber.

10. A temperature compensating optical waveguide device comprising:

an optical fiber for passing light through and having a fiber cladding surrounding a fiber core in which a grating comprising a multiplicity of grating elements is embedded within a portion of the core, said grating elements being located and configured so as to reflect light passing through the optical fiber within a range about a central wavelength that varies with changes in temperature of the device and in an axial strain applied to the grating;

a compensating member having a first surface mounted to the cladding along a portion of said fiber including the grating; and a tension adjusting member connected so as to restrain in an axial direction said compensating member, said compensating member being formed of a material having a characteristic expansion coefficient less than a characteristic expansion coefficient of a material comprising said tension adjusting member so that, as the temperature of said device decreases said tension adjusting member contracts more than said compensating member and exerts forces on the compensating member that cause the first surface of said compensating member to bend and impose an axial strain on the grating so that variations in the central wavelength resulting from said imposed axial strain on the grating substantially compensate for variations in the central wavelength resulting from the decrease in the device temperature, and as the temperature of said device increases said tension adjusting member expands more than said compensating member and eases the imposed axial strain on the grating so that variations in the central wavelength resulting from said imposed axial strain on the grating substantially compensate for variations in the central wavelength resulting from the increase in the device temperature.

11. The device of claim 10, wherein said compensating member has a groove extending axially along said first surface for receiving said optical fiber.

12. The device of claim 10, wherein said tension adjusting member has a channel extending laterally across its front surface, the channel being defined by a back wall and side walls with each of the side walls comprising a slanted portion and a perpendicular portion substantially normal to a bottom surface of said tension adjusting member.

13. The device of claim 12, wherein said compensating member and said tension adjusting member are configured so that when said device is at an approximately highest operating temperature, sides of the compensating member abut the perpendicular portions of the side walls of said tension adjusting member and when said device cools to a temperature lower than the approximately highest operating temperature, the sides of said compensating member slope toward one another and approach the slanted portions of the side walls of said tension adjusting member.

14. The device of claim 10, wherein said compensating member is formed of a moldable material.

15. The device of claim 14, wherein said compensating member further comprises protruding members extending substantially axially outward from a second surface of said compensating member.

16. The device of claim 15, wherein said tension adjusting member has a plurality of apertures defined therethrough from a top surface to a bottom surface thereof for receiving said protruding members.

17. The device of claim 10, wherein said grating elements are oriented substantially normal to a longitudinal axis of said fiber and are substantially equidistantly spaced apart in the axial direction of said fiber.

18. A method of compensating for variations, caused by temperature variations, in a central wavelength of an optical waveguide device which include an optical fiber with a grating embedded therein that reflects light passing through the optical fiber within a range about the central wavelength and a compensating member mounted to the optical fiber along a portion including the grating, said method comprising the step of:

restraining in an axial direction a portion of the compensating member so that as the temperature of the device decreases forces are exerted on the compensating member that cause a first surface of said compensating member to bend and impose an axial strain on the grating so that variations in the central wavelength resulting from the imposed axial strain of the grating substantially compensate for variations in the central wavelength resulting from a decrease in the temperature of the device and, accordingly, of the grating, and so that as the temperature of the device increases the forces exerted on the compensating member are eased and the axial strain imposed on the grating is reduced so that variations in the central wavelength resulting from the imposed axial strain of the grating substantially compensate for variations in the central wavelength resulting from an increase in the temperature of the device and, accordingly, of the grating.

19. The method of claim 18, wherein said restraining step is accomplished by structure defined to include a compensating member having a first surface mounted to the optical fiber along a portion of the fiber including the grating, and a tension adjusting member connected so as to restrain in an axial direction a portion of said compensating member.

20. The method of claim 19, wherein said tension adjusting member has a channel extending laterally across its front surface, the channel being defined by a back wall and side walls with each of the side walls comprising a slanted portion and a perpendicular portion substantially normal to a bottom surface of said tension adjusting member.

21. The method of claim 20, wherein said compensating member and said tension adjusting member are configured so that when the optical fiber is at an approximately highest operating temperature, sides of the compensating member abut the perpendicular portions of the side walls of said tension adjusting member and when the optical fiber cools to a temperature lower than the approximately highest operating temperature, the sides of said compensating member slope toward one another and approach the slanted portions of the side walls of said tension adjusting member.

22. The method of claim 19, further comprising protruding members extending substantially axially outward from a second surface of said compensating member.

23. The method of claim 22, wherein said tension adjusting member has a plurality of apertures defined therethrough from a top surface to a bottom surface thereof for receiving the protruding members.

24. The method of claim 18, wherein the grating elements are oriented substantially normal to a longitudinal axis of the fiber and are substantially equidistantly spaced in the axial direction of the fiber.

* * * * *